United States Patent

Leatherman et al.

[11] 4,069,168
[45] Jan. 17, 1978

[54] TUNGSTEN HEXACARBONYL IN PLASTIC LENSES

[75] Inventors: I. Roger Leatherman, Wadsworth; Michael S. Misura, Barberton, both of Ohio

[73] Assignee: PPG Industries, Inc., Pittsburgh, Pa.

[21] Appl. No.: 728,561

[22] Filed: Oct. 1, 1976

[51] Int. Cl.² .................................................. G02B 5/23
[52] U.S. Cl. ................................. 252/300; 350/160 P
[58] Field of Search ............... 252/300 P; 350/160 P; 96/90 PC

[56] References Cited

U.S. PATENT DOCUMENTS

| | | | |
|---|---|---|---|
| 2,403,113 | 7/1946 | Muskat et al. | 260/77.5 UA |
| 3,222,432 | 12/1965 | Grandperret | 264/1 |
| 3,293,037 | 12/1966 | Chopoorian | 96/90 |
| 3,317,321 | 5/1967 | Chopoorian | 96/88 |
| 3,355,294 | 11/1967 | Giddings | 96/90 |
| 3,397,059 | 8/1968 | Dorion et al. | 96/87 |
| 3,475,339 | 10/1969 | Foster et al. | 252/300 |
| 3,576,755 | 4/1971 | Patella et al. | 252/300 |
| 3,692,688 | 9/1972 | Castellion et al. | 252/300 |

OTHER PUBLICATIONS

Massey, A. G., "A Reversible Photochromic Polymer," *Nature*, vol. 191, No. 4796, Sept. 30, 1961, p. 1387.

M. A. El-Sayed, "A New Class of Photochromic Substances: Metal Carbonyls," *J. Phys. Chem.*, 68, 433 (1964).

*Primary Examiner*—Benjamin R. Padgett
*Assistant Examiner*—Deborah L. Kyle
*Attorney, Agent, or Firm*—Richard M. Goldman; William M. Dooley; Irwin M. Stein

[57] ABSTRACT

Tungsten hexacarbonyl acts as a photochromic agent and an infrared absorber when incorporated in liquid allyl glycol carbonates, such as allyl diglycol carbonate, and polymerizates thereof. Photochromic, infrared-absorbing optical and ophthalmic lenses containing tungsten derived from tungsten hexacarbonyl are made.

15 Claims, 1 Drawing Figure

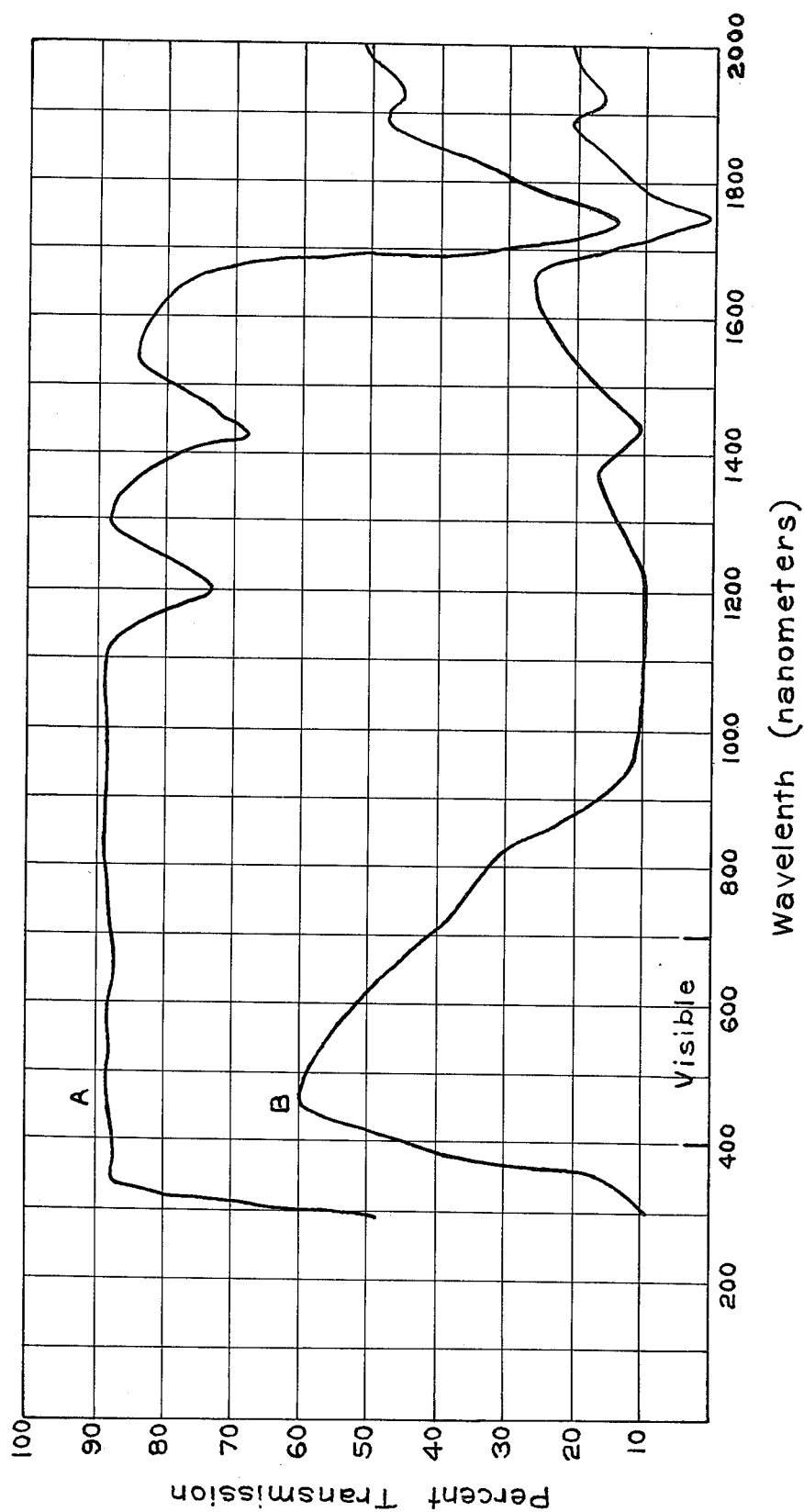

TUNGSTEN HEXACARBONYL IN PLASTIC LENSES

BACKGROUND OF THE INVENTION

This invention relates to photochromic compositions including liquids and polymerizates thereof having good infrared absorption and to methods for making them.

High quality optical lenses are widely made by polymerizing allyl diglycol carbonate, i.e., diethylene glycol bis(allyl carbonate), or mixtures thereof with minor proportions of other monomers such as methyl methacrylate and vinyl acetate in molds. Tinted lenses are generally made by dip-dyeing in heated solutions of a variety of organic dyes. However, most such lenses, whether tinted or colorless, transmit infrared freely.

U.S. Pat. No. 3,692,688 discloses essentially haze-free optical filters of polymethylmethacrylate containing an in situ reaction product of tungsten hexachloride and stannous chloride which is said to filter near infrared radiation efficiently while retaining considerable transmittance of light in the visible region. It is stated that the magnitude of the mole ratio of stannous chloride to tungsten hexachloride is as important a factor as the concentration of the tungsten hexachloride in affecting the filtering efficiency.

U.S. Pat. No. 3,355,294 discloses photochromic compositions containing a thermoplastic polymer, a metal compound such as tungsten hexachloride or tungsten dioxidedichloride, and a metal salt such as ferric chloride which increases the bleaching rate in darkness. A film cast from a solution of polymethylmethacrylate and tungsten hexachloride in dioxane is said to be photochromic, changing from colorless to blue upon exposure to ultraviolet radiation, but has a slower bleaching rate than one containing ferric chloride. It is stated that the disclosed compositions are not photochromic until they are formed into a definite shaped article, such as by casting.

Applicant has found that although lenses made by the polymerization of allyl diglycol carbonate having tungsten hexachloride dissolved therein are photochromic, becoming blue upon exposure to ultraviolet radiation, and absorb infrared when in the colored state, they are hazy and have a permanent undesirable yellow cast upon removal from the molds.

It has been reported by El-Sayed in the *Journal of Physical Chemistry*, Vol. 68, pp. 433-434, (1964), that tungsten hexacarbonyl is photochromic when dissolved in certain solvents. However, the compound reported displayed a color shift to yellow, which is not a desirable color for sunglasses.

The FIGURE shows a typical transmittance curve of the photochromic compositions of this invention before and after exposure to ultraviolet radiation.

DESCRIPTION OF THE INVENTION

It has now been found that tungsten hexacarbonyl, $W(CO)_6$, may be incorporated in liquid allyl glycol carbonates or solid poly(allyl glycol carbonate) in order to produce photochromic liquids and lenses, sheets, or other shapes which are optically clear and substantially haze-free, are initially water-white, display a desirable photochromic color shift to blue in response to daylight, have substantial infrared absorbance in the blue state, and have a reasonable service life. By "substantial infrared absorbance" is meant absorbance in the infrared region at least as great as the average absorbance in the visible region.

In accordance with the practice of this invention, tungsten hexacarbonyl may be dissolved or dispersed uniformly in an allyl glycol carbonate monomer, notably allyl diglycol carbonate, to provide a photochromic composition which may then be polymerized in known ways to produce photochromic polymerizates having substantial infrared absorbance.

Solutions of tungsten hexacarbonyl in allyl glycol carbonate monomers are themselves photochromic and, when protected from high temperatures, are sufficiently stable to be shipped and stored. Such compositions may be made up by a supplier of monomers and shipped to a lens maker who may use them directly in place of non-photochromic monomer in his lens fabricating process.

Tungsten hexacarbonyl is a known compound which is available on the market. Methods of preparation appear in the literature. See, for example, U.S. Pat. Nos. 1,894,239 and 1,921,536.

Monomers which may be used in the practice of this invention are normally liquid allyl glycol carbonate, i.e., glycol bis(allyl carbonate), compounds in which the allyl groups may be substituted at the 2 position with a halogen, notably chlorine or bromine, or a 1 to 4 carbon alkyl group, notably a methyl or ethyl group, and the glycol group may be an alkylene, alkylene ether, or alkylene polyether group having a total of from 2 to 10 carbons and oxygens. These monomers may be represented by the formula:

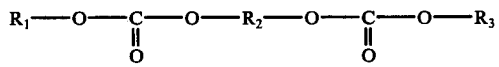

in which $R_1$ and $R_3$ are the allyl groups and $R_2$ is the glycol group. $R_1$ and $R_3$ may be represented by the formula

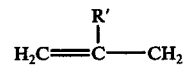

wherein R' is hydrogen, halogen, or a 1 to 4 carbon alkyl group. Specific example of $R_1$ and $R_3$ include allyl, 2-chloroallyl, 2-bromoallyl, 2-iodallyl, 2-fluoroallyl, 2-methallyl, 2-ethylallyl, 2-isopropylallyl, 2-n-propylallyl, and 2-n-butylallyl groups. Such compounds and methods for making them are disclosed in U.S. Pat. Nos. 2,370,567 and 2,403,113. Specific examples of $R_2$ include alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2CH_2-$, and $-CH_2CH_2CH_2-O-CH_2CH_2CH_2-$, and alkylene polyether groups such as $-CH_2CH_2O-CH_2CH_2-O-CH_2CH_2-$, and $-CH_2-O-CH_2CH_2-O-CH_2-$ groups.

Specific examples of such monomers include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

It is believed that all of the above-described allyl glycol carbonates are useful in the practice of this invention because of their similarity to ally diglycol carbonate,

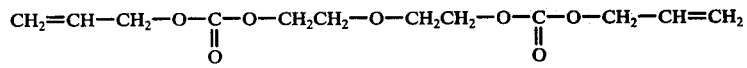

which has been tested and found useful. Allyl diglycol carbonate, also called diethylene glycol bis(allyl carbonate), the preferred monomer for use in the practice of this invention, is in wide commercial use in the production of high quality optical lenses.

These monomers or mixtures thereof containing tungsten hexacarbonyl may be polymerized in the presence of heat, radiation, or catalysts such as organic peroxides, for example diisopropyl peroxydicarbonate, di-sec-butyl peroxy dicarbonate, lauroyl peroxide, and benzoyl peroxide, to yield photochromic polymerizates having a wide range of physical properties such as hardness, abrasion resistance, and impact resistance. Other monomers, such as vinyl acetate and methyl methacrylate, may be included in minor proportions, up to a total of about 25 weight percent, in order to obtain copolymers or terpolymers having desired physical properties. Such copolymers and terpolymers having at least about 75 weight percent of the described allyl glycol carbonate units are also believed to be useful in the practice of this invention, but it is preferred to use only the allyl glycol carbonates, particularly allyl diglycol carbonate, in combination with the tungsten hexacarbonyl.

The addition of tungsten hexacarbonyl to an allyl glycol carbonate monomer requires little, if any, modification in the methods ordinarily used to effect polymerization of such monomers. High concentrations of tungsten hexacarbonyl, e.g., between about 0.3 and 0.5 weight percent or more may retard cure, but an increase in the concentration of polymerization catalyst, higher temperature, or a longer cure time may be used to reduce this effect. At concentrations up to about 0.1 percent, there is little if any retardation of cure. Thus any known method of polymerizing these monomers may be used to polymerize the monomers having tungsten hexacarbonyl dissolved therein. U.S. Pat. Nos. 2,403,113 and 3,222,432 describe useful methods. Suppliers of allyl diglycol carbonate also distribute information on methods of making lenses and sheets.

Typically, the monomers are polymerized in full, air tight molds because air retards polymerization. A free radical catalyst such as an organic peroxide or peroxy carbonate, is dissolved in the monomer in a concentration of between about 0.1 and 10 weight percent, typically between about 2 and 5 weight percent, and the catalyzed monomer is heated to effect the desired degree of polymerization. Temperatures between about 30° and 120° C. and times between about 1 and 24 hours are generally employed. Heating may be at a constant temperature, at gradually increasing temperatures, or at stepwise increasing temperatures. Useful heat cycles for the polymerization of allyl diglycol carbonate are disclosed in Dial et al., Polymerization Control in Coating a Thermosetting Resin, *Industrial and Engineering Chemistry*, Vol. 49, page 2447 (Dec., 1955).

Tungsten hexacarbonyl may be incorporated in a monomer or mixture thereof in concentrations of between about 0.01 and 1.0 weight percent based on the weight of monomer or more, preferably between about 0.1 and 0.5 weight percent, to give a composition which may be polymerized to obtain transparent, photochromic polymerizate. It has been found that when substantially more than 0.1 weight percent is used, a polymerizate produced by adding about 3.5 weight percent diisopropyl peroxydicarbonate and heating at temperatures gradually increasing from 45° to 100° C. over a period of 18 hours contains small bubbles. However, it the polymerizate is intended for decorative use, such as sheeting for use in stained windows, the presence of bubbles may even be an advantage, and so concentrations of tungsten hexacarbonyl greater than 0.1 percent may be used. Thus, saturated solutions of tungsten carbonyl in an allyl glycol carbonate, or even dispersions of finely divided tungsten hexacarbonyl in an allyl glycol carbonate may be polymerized to obtain useful products.

When more than 0.1 weight percent of tungsten hexacarbonyl is used, the generation of bubbles upon polymerization may be reduced or avoided by first exposing the monomer containing tungsten hexacarbonyl to ultraviolet radiation, whereupon the solution turns blue and bubbles are evolved, and then degrassing the solution under vacuum. The time of exposure will vary depending upon the intensity of the ultraviolet radiation, the volume of solution, and the concentration of tungsten hexacarbonyl. Any time of exposure which leads to the evolution of visible bubbles in the solution will serve to reduce bubbling upon polymerization. Desirably, exposure is continued at least until the evolution of visible bubbles ceases and the blue color of the solution is most intense.

For example, a 0.3 weight percent solution of tungsten hexacarbonyl in allyl glycol carbonate was exposed to ultraviolet radiation from a carbon arc in a Fadeometer. Evolution of bubbles began within a few minutes and continued at decreasing rates for 3 hours, at which time bubbles were still being evolved slowly. The solution was then degassed under vacuum in a dessicator for about 3 hours. A polymerizate prepared by heating degassed solution in the presence of 3.5 weight percent diisopropyl peroxydicarbonate was photochromic and free of bubbles.

It is preferable to dissolve or disperse the tungsten carbonyl uniformly in the monomer before polymerization in order to incorporate the tungsten hexacarbonyl uniformly in the polymerizate so that a number of articles having uniform properties may be produced. However, if desired, an object such as a lens made from monomer free of tungsten hexacarbonyl may be made photochromic by soaking in a heated solution of tungsten hexacarbonyl in a halogenated aromatic or aliphtic organic solvent such as bromobenzene, methylchloroform, or trichloroethylene, in order to incorporate tungsten hexacarbonyl into the surface of the article. Temperatures between about 70° and 110° C. and soaking times of between about 5 minutes and 2 hours are useful. At lower temperatures, the rate of incorporation may be too slow; at higher temperatures, the objects, particularly lenses and flat sheets, may warp. This technique may also be used to increase the total tungsten content of optical lenses or other objects made from a solution of tungsten hexacarbonyl in liquid monomer in order to increase the maximum optical density of the lens without encountering the bubble formation that may occur when a high concentration of tungsten hexacarbonyl is present during polymerization. In addition, a photochromic lens or sheet into which tungsten hexacarbonyl has been incorporated may be dip-dyed in the conventional way to provide a minimum optical density even when it is in the bleached, or photochromically relaxed state. Prolonged heating of a solution of tungsten hexacarbonyl may result in deterioration. It is therefore advisable to prepare fresh solutions frequently.

The photochromic polymerizates of the present invention have good service lives, although after a time the change in optical density in response to light and darkness decreases moderately. When tungsten hexacarbonyl is dissolved in the monomer, the polymerizate thereof will, after a number of light-dark cycles, take on a non-fading blue cast in the relaxed state, but it retains significant photochromic response and the maximum absorbance, including infrared absorbance, may increase. When the polymerizate is treated in a solution of tungsten hexacarbonyl, the maximum absorbance of the resulting product will gradually decline, but even after many light-dark cycles, significant photochromic response and infrared absorbance remains.

When tungsten hexacarbonyl is incorporated in liquid monomer or is incorporated into polymer by dip-dyeing, it is believed to be present initially as tungsten hexacarbonyl. However, when the monomer is polymerized, or when the monomer or polymer is exposed to ultraviolet radiation, the tungsten hexacarbonyl is believed to undergo a chemical reaction with the monomer or polymer. Thus, certain compositions of the present invention may be said to contain tungsten hexacarbonyl, whereas others may be said to contain a photochromic tungsten species derived from tungsten hexacarbonyl by reaction with the monomer or polymerizate thereof under the influence or ultraviolet radiation or a free radical initiator such as an organic peroxy carbonate polymerization catalyst. Thus, a statement in the specification or the claims that monomer or polymer has tungsten hexacarbonyl incorporated therein is intended to include incorporation of the tungsten hexacarbonyl by reaction as well as by solution or absorption.

When in the blue-colored state, the photochromic polymerizates of this invention have low transmittance in the near infrared region from about 700 to about 2000 nanometers, and only moderate transmittance in the visible region from about 300 to about 700 nanometers. The FIGURE graphically depicts the visible and infrared transmittance, before and after exposure to ultraviolet radiation, of a ⅛-inch thick flt sheet cast from a 0.1 weight percent solution of tungsten hexacarbonyl in allyl diglycol carbonate, showing the particularly low transmittance in the near infrared region from about 900 to about 1200 nanometers. Before exposure, the polymerizate was nearly colorless. After exposure, it was deep blue.

The following examples illustrate how the present invention may be practiced. Although the examples describe polymerizates of allyl diglycol carbonate, the methods described may be practiced with the use of the other allyl glycol carbonate monomers or mixtures thereof disclosed herein.

EXAMPLE I

Tungsten hexacarbonyl, 0.1 weight percent, was dissolved in allyl diglycol carbonate at about 80°–90° C. To a portion of this solution was added 3.5 weight percent diisopropyl peroxydicarbonate and the catalyzed solution was cured in a full, air-tight mold for 24 hours at gradually increasing temperature in accordance with the EP-11 cure cycle as set forth in Table 1.

On exposure to a blacklamp, the polymerizate, a ⅛-inch thick flat sheet, turned blue. Overnight in darkness, the blue color faded significantly, and was regenerated by a second exposure to the blacklamp.

TABLE 1

| EP-11 Cure Cycle | |
|---|---|
| Elapsed Time (hours) | Temperature, ° C. |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

EXAMPLE II

Samples of allyl diglycol carbonate containing 0.1 weight percent tungsten hexacarbonyl were cast as ⅛-inch thick sheets in accordance with the EP-11 cycle with the use of various catalysts: diisopropyl peroxydicarbonate (IPP), di-sec-butyl peroxydicarbonate (SBP) and benzoyl peroxide. The polymerizates were exposed to blacklamp illumination and then placed in darkness. Transmittance mesurements at 500 nanometers, green light, were made at intervals during the exposure and recovery periods. The results are reported in Table 2.

TABLE 2

PHOTOCHROMIC PROPERTIES OF THE ALLYL DIGLYCOL CARBONATE, $W(CO)_6$ SYSTEM CURED WITH DIFFERENT CATALYSTS

| Time After Exposure to Blacklamp[1] (10" Distant) | Percent Transmissionn (500 nanometers) | | | |
|---|---|---|---|---|
| | 3.5% IPP 0.1% $W(CO)_6$ | 4.5% IPP 0.1% $W(CO)_6$ | 3.5% SBP 0.1% $W(CO)_6$ | 3.5% Benzoyl Peroxide 0.1% $W(CO)_6$ |
| 0 | 76.6 | 75.0 | 77.0 | 80.0 |
| 15 min | 60.0 | 57.7 | 61.0 | 69.2 |
| 45 min | 44.2 (blue) | 41.8 (blue) | 43.8 (blue) | 60.2 (blue) |
| Time in Dark | | | | |
| 16 hrs | 48.8 | 45.9 | 48.3 | 71.2 |
| 4 days | 51.2 | 49.3 | 50.0 | 75.2 |
| 5 days | 51.2 | 50.2 | 49.6 | 75.8 |
| 6 days | 51.2 | 50.7 | 49.2 | 77.3 |

TABLE 2-continued
PHOTOCHROMIC PROPERTIES OF THE ALLYL DIGLYCOL CARBONATE, $W(CO)_6$ SYSTEM CURED WITH DIFFERENT CATALYSTS

| Time After Exposure to Blacklamp[1] (10" Distant) | Percent Transmissionn (500 nanometers) | | | |
|---|---|---|---|---|
| | 3.5% IPP 0.1% $W(CO)_6$ | 4.5% IPP 0.1% $W(CO)_6$ | 3.5% SBP 0.1% $W(CO)_6$ | 3.5% Benzoyl Peroxide 0.1% $W(CO)_6$ |
| 7 days | 51.5 | 50.9 | 48.8 | 77.2 |

[1]General Electric 100 watt, PAR-38, A.S.A. Code H44-4JM

EXAMPLE III

A sample of a polymerizate made from a 0.1 weight percent solution of tungsten hexacarbonyl in allyl diglycol carbonate was exposed outdoors to full, midday sunlight and then kept in darkness. Table 3 reports transmittance measurements made at intervals during the exposure and recovery periods.

TABLE 3
RESPONSE OF ALLYL DIGLYCOL CARBONATE, $W(CO)_6$ SYSTEM TO SUNLIGHT

| Time After Exposure to Sunlight | Percent Transmission (500 nanometers) CR-39 0.1% $W(CO)_6$ |
|---|---|
| 0 | 87 |
| 1 min | 85 |
| 2 min | 82 |
| 4 min | 80 |
| 10 min | 75 |
| 20 min | 71 |
| 50 min | 69 (blue) |
| Time in Dark | |
| 3 min | 71 |
| 10 min | 72 |
| 100 min | 79 |
| 220 min | 84 |
| 300 min | 85 |

EXAMPLE IV

The rates of the darkening and recovery reactions are affected by the state of cure of the polymerizate. Samples of allyl diglycol carbonate having dissolved therein 0.1 weight percent tungsten hexacarbonyl and 3.5 weight percent IPP were cured for various times to provide undercured normally cured, and overcured polymerizates. The results of darkening and recovery measurements are reported in Table 4. Undercured samples were very soft.

TABLE 4
EFFECTS OF SMALL QUANTITIES OF RESIDUAL CATALYST ON PHOTOCHROMIC PROPERTIES OF ALLYL DIGLYCOL CARBONATE CONTAINING 0.1% $W(CO)_6$

| Extent of Cure Variation From Normal 24 Hr EP-11 Cycle | Percent Transmission (500 nanometers) | | | | | | | | |
|---|---|---|---|---|---|---|---|---|---|
| | Exposure to Blacklamp (min) | | | | | Time in Dark (min) | | | |
| | Orig. | 1 | 5 | 10 | 50 | 3 | 10 | 100 | ~6 hr |
| 90 min early removal | 87.8 | 85.0 | 81.0 | 74.5 | 73.5 | 76.2 | 78.8 | 80.1 | 87.0 |
| 60 min early removal | 87.8 | 85.0 | 80.0 | 75.0 | 72.5 | 74.2 | 76.0 | 79.2 | 86.0 |
| 30 min early removal | 85.0 | 82.5 | 79.0 | 75.5 | 68.5 | 71.5 | 71.0 | 76.0 | 82.5 |
| Full EP-11 cycle | 85.8 | 83.0 | 79.5 | 74.5 | 61.0 | 62.8 | 64.0 | 67.0 | 78.0 |
| Full EP-11 cycle + 1 hr 100° C. | 80.8 | 79.0 | 75.5 | 69.5 | 58.8 | 58.8 | 58.8 | 58.8 | 56.5 |
| Full EP-11 cycle + 2 hr 100° C. | 78.8 | 78.1 | 73.5 | 71.0 | 60.8 | 61.0 | 61.0 | 61.5 | 60.0 |
| Full EP-11 cycle + 3 hr 100° C. | 76.8 | 75.8 | 70.5 | 68.8 | 56.5 | 58.8 | 58.8 | 58.8 | 58.0 |

The reason for the effect of differences in cure on the photochromic response of these polymerizates is not known. However, it may be seen that significant photochromic response is retained over a wide range of cure states. Even very overcured samples darken upon exposure and thus would be useful as infrared absorbers. The use of the standard cure cycle produces a polymerizate having more balanced darkening and recovery rates.

EXAMPLE V

A polymerizate (A) was prepared from a 0.1 weight percent solution of tungsten hexacarbonyl in allyl diglycol carbonate. A second slightly undercured polymerizate (B) of allyl diglycol carbonate, not containing tungsten, was soaked in a 14 weight percent solution of tungsten hexacarbonyl in bromobenzene for 10 minutes at 100° C. The solution became brown and an unidentified white, crystalline precipitate was formed. The soaked polymerizate was brown after being rinsed in acetone, and clear after an hour in an oven at 100° C.

Samples A and B were placed on a turntable rotating at 4 revolutions per minute. A blacklamp mounted 10 inches above an edge of the table was connected to a timer which cycled it on for 3 hours, off for 3 hours, etc., during the period of exposure. The darkening and lightening rates were measured before placing the samples on the turntable. Then after a number of days of exposure on the table under the cycling blacklamp followed by 3 days of recovery in darkness, the samples were again tested for darkening and lightening response. The exposure-recovery-test sequence was then repeated. Table 5 reports the results of this fatigue testing.

TABLE 5
FATIGUE TESTING OF ALLYL GLYCOL CARBONATE CONTAINING $W(CO)_6$

| Sample No. | Sample History | Percent Transmission (500 nanometers) | | | | | | | | |
|---|---|---|---|---|---|---|---|---|---|---|
| | | Exposure to Blacklamp (min) | | | | | Time in Dark (min) | | | |
| | | Orig. | 1 | 5 | 10 | 50 | 3 | 10 | 100 | Overnight |
| A[1] | Before Continual Exposure | 87.5 | 84.8 | 78.2 | 77.0 | 75.5 | 76.5 | 78.2 | 81.8 | 86.5 |
| | 3-day exposure, 3-day recovery | 82.0 | 79.8 | 76.2 | 73.8 | 65.0 | 65.0 | 66.0 | 68.0 | 76.5 |
| | 6-day exposure, 3-day recovery | 53.0 | 54.0 | 52.8 | 51.0 | 45.0 | 45.0 | 45.0 | 46.5 | 52.0 |
| B[2] | Before Continual Exposure | 87.0 | 86.0 | 83.0 | 82.0 | 75.0 | 76.0 | 77.0 | 79.0 | 85.0 |
| | 3-day exposure, 3-day recovery | 87.0 | 85.0 | 82.0 | 81.0 | 74.0 | 77.0 | 79.0 | 81.0 | 85.0 |

TABLE 5-continued

FATIGUE TESTING OF ALLYL GLYCOL CARBONATE CONTAINING W(CO)$_6$

| Sample No. | Sample History | Percent Transmission (500 nanometers) | | | | | | | |
|---|---|---|---|---|---|---|---|---|---|
| | | Exposure to Blacklamp (min) | | | | Time in Dark (min) | | | |
| | | Orig. | 1 | 5 | 10 | 50 | 3 | 10 | 100 | Overnight |
| | 6-day exposure, 3-day recovery | 87.0 | 86.0 | 82.0 | 81.0 | 78.0 | 79.0 | 81.0 | 83.0 | 85.0 |
| | 9-day exposure, 3-day recovery | 86.0 | 84.0 | 82.0 | 81.0 | 77.0 | 78.0 | 79.0 | 81.0 | 85.0 |
| | 15-day xposure, 3-day recovery | 86.0 | 86.0 | 82.0 | 81.0 | 77.0 | 77.0 | 79.0 | — | 86.0 |

$^1\frac{1}{8}''$ sheet with 0.1% W(CO)$_6$ incorporated internally.
$^2\frac{1}{8}''$ sheet with W(CO)$_6$ incorporated by dip-dyeing.

When the tungsten hexacarbonyl is incorporated in the monomer before polymerization (A), fatigue leads to an overall darkening of the polymerizate and a slowing of the recovery rate. However, the effectiveness of the polymerizate as an infrared absorber increases as it darkens.

When the tungsten hexacarbonyl is incorporated by dip-dyeing, the original photochromic response is maintained over long periods of exposure. Therefore, where high infrared absorbance is desired, it may be preferable to incorporate the tungsten hexacarbonyl into the monomer before polymerization, but if greater fatigue resistance is desired, surface incorporation by dip-dyeing may be preferred.

Although this invention has been described in terms of specific details and embodiments, the description is not intended to limit the invention, the scope of which is defined in the following claims.

We claim:

1. A liquid composition comprising a mixture of allyl glycol carbonate monomer and sufficient tungsten hexacarbonyl to provide a photochromic polymerizate that become blue and has substantial infrared absorbance upon exposure to ultraviolet radiation.

2. The composition of claim 1, wherein the monomer is diethylene glycol bis(allyl carbonate).

3. The composition of claim 2, wherein the tungsten hexacarbonyl is present in a concentration of between about 0.1 and 0.5 percent by weight of the monomer.

4. A composition prepared by exposing composition of claim 1 to ultraviolet radiation until gas is evolved and then degassing the exposed composition.

5. A solid poly(ally glycol carbonate) photochromic polymerizate article having tungsten hexacarbonyl uniformly incorporated therein, said article becoming blue and having substantial infrared absorbance upon exposure to ultraviolet radiation.

6. The poly(allyl glycol carbonate) article of claim 5, wherein the allyl glycol carbonate is diethylene glycol bis(allyl carbonate).

7. The poly(allyl glycol carbonate) article of claim 6, having a tungsten content of between about 0.1 and 0.5 percent by weight of poly(allyl glycol carbonate), calculated as tungsten hexacarbonyl.

8. A solid poly(allyl glycol carbonate) article having a photochromic quantity of tungsten hexacarbonyl incorporated in its surface, said article turning blue and having substantial infrared absorbance upon exposure to ultraviolet radiation.

9. The article of claim 8 wherein the allyl glycol carbonate is diethylene glycol bis(allyl carbonate).

10. A method of making a photochromic article which comprises:
   adding a photochromic amount of tungsten hexacarbonyl to a liquid allyl glycerol carbonate monomer to form a mixture, and
   polymerizing the mixture to form a solid photochromic polymerizate article which turns blue and has substantial infrared absorbance upon exposure to ultraviolet radiation.

11. The method of claim 10, wherein the monomer is diethylene glycol bis(allyl carbonate) and the tungsten hexacarbonyl is added in a concentration of between about 0.1 and 0.5 percent by weight of monomer.

12. The method of claim 11, wherein polymerization is effected by adding an organic peroxide initiator to the mixture and heating the mixture to form a solid polymerizate.

13. A method of making a photochromic article which turns blue and has substantial infrared absorbance upon exposure to ultraviolet radiation, which method comprises soaking a poly(allyl glycol carbonate) article in a heated solution of tungsten hexacarbonyl in an organic solvent whereby to deposit a photochromic amount of tungsten hexacarbonyl in said article and removing the solvent from the article.

14. A method of making a photochromic article which comprises:
   adding from about 0.1 to about 0.5 weight percent tungsten hexacarbonyl to a liquid allyl glycerol carbonate monomer, basis weight of the monomer, to form a mixture, and
   polymerizing the mixture to form a solid article.

15. The method of claim 14, wherein polymerization is effected by adding an organic peroxide initiator to the mixture and heating the mixture to form a solid polymerizate.

* * * * *